(12) United States Patent
Baumoel

(10) Patent No.: US 8,505,391 B1
(45) Date of Patent: Aug. 13, 2013

(54) FLANGE MOUNTED ULTRASONIC FLOWMETER

(76) Inventor: Joseph Baumoel, Wellington, FL (US)

(*) Notice: Subject to any disclaimer, the term of this patent is extended or adjusted under 35 U.S.C. 154(b) by 0 days.

(21) Appl. No.: 13/492,336

(22) Filed: Jun. 8, 2012

Related U.S. Application Data

(60) Provisional application No. 61/617,744, filed on Mar. 30, 2012.

(51) Int. Cl.
*G01F 1/66* (2006.01)

(52) U.S. Cl.
USPC .................. 73/861.28; 73/861.29; 73/649

(58) Field of Classification Search
None
See application file for complete search history.

(56) References Cited

U.S. PATENT DOCUMENTS

| | | | | |
|---|---|---|---|---|
| 2,746,291 A * | 5/1956 | Swengel | .................... | 73/861.28 |
| 3,817,098 A * | 6/1974 | Brown | ..................... | 73/861.28 |
| 4,144,752 A * | 3/1979 | Lolk | ........................ | 73/861.28 |
| 4,297,607 A * | 10/1981 | Lynnworth et al. | ........ | 73/861.18 |
| 4,480,486 A * | 11/1984 | Meisser et al. | ............. | 73/861.28 |
| 5,105,666 A * | 4/1992 | Steinacher | .................. | 73/861.28 |
| 5,433,117 A * | 7/1995 | Taphorn et al. | ............ | 73/861.28 |
| 5,597,962 A * | 1/1997 | Hastings et al. | ........... | 73/861.29 |
| 5,627,323 A * | 5/1997 | Stern | ........................... | 73/861.28 |
| 5,811,689 A * | 9/1998 | Collier et al. | ............... | 73/861.28 |
| 6,026,693 A * | 2/2000 | Baumoel et al. | ............ | 73/861.27 |
| 6,055,868 A * | 5/2000 | Koyano et al. | ............. | 73/861.28 |
| 6,338,277 B1 * | 1/2002 | Diston et al. | ................ | 73/861.28 |
| 7,448,282 B2 * | 11/2008 | Wiest et al. | ................ | 73/861.28 |
| 7,911,306 B2 * | 3/2011 | Allen | ......................... | 73/861.28 |
| 8,356,522 B2 * | 1/2013 | Allen | ......................... | 73/861.28 |
| 2003/0051559 A1 * | 3/2003 | Ehrlich et al. | ............. | 73/861.28 |
| 2007/0034016 A1 * | 2/2007 | Maginnis et al. | ........... | 73/861.28 |
| 2007/0186681 A1 * | 8/2007 | Shkarlet et al. | ............ | 73/861.28 |
| 2008/0236297 A1 * | 10/2008 | Fleet et al. | ................. | 73/861.28 |
| 2009/0019945 A1 * | 1/2009 | Matsushita | ................ | 73/861.28 |

* cited by examiner

*Primary Examiner* — Harshad R Patel

(74) *Attorney, Agent, or Firm* — F. Chau & Associates, LLC

(57) ABSTRACT

An ultrasonic transducer includes a piezoelectric element that is attached to a sonic lens, a support ring that holds the piezoelectric element, a flange, and a spoke. One end of the spoke is connected to the support ring and an opposing end of the spoke is connected to an inner surface of the flange. The sonic lens may be plastic film that coats the piezoelectric element.

32 Claims, 8 Drawing Sheets

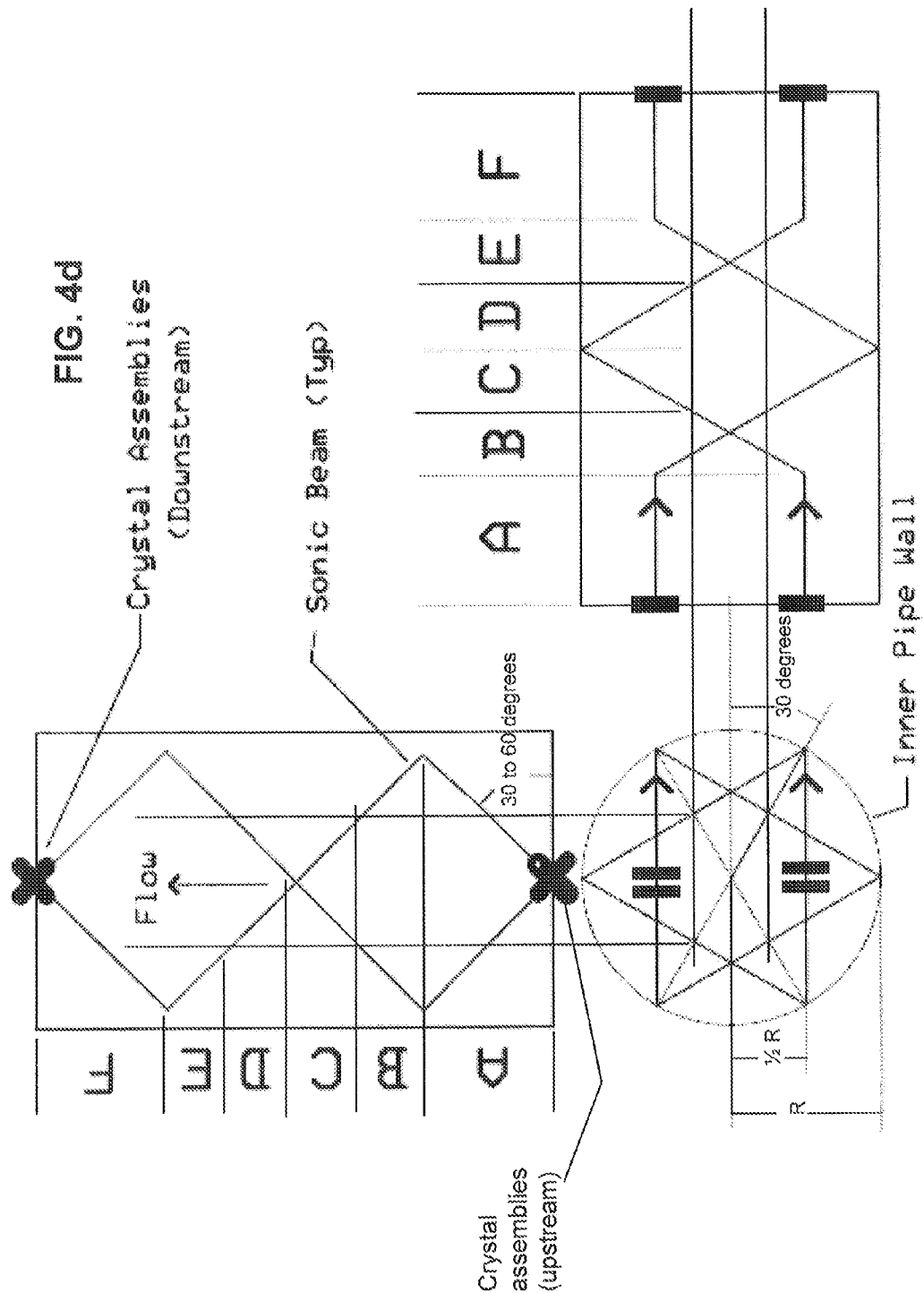

FLANGE MOUNTED ULTRASONIC FLOWMETER

CROSS-REFERENCE TO RELATED APPLICATIONS

This application claims priority to U.S. Provisional Application No. 61/617,744, filed on Mar. 30, 2012, the disclosure of which is incorporated by reference herein.

TECHNICAL FIELD

The present disclosure relates to ultra sonic flow meters, and more particularly to flange mounted ultrasonic flow meters.

DISCUSSION OF RELATED ART

A fluid is a substance that continually deforms (flows) under an applied shear stress. Fluids are a subset of the phases of matter and include liquids, gases, and plasmas. Flow measurement is the quantification of bulk fluid movement. Flow can be measured in a variety of ways.

A flow meter is an instrument use to measure linear, non-linear, mass, or volumetric flow rate of a fluid. An ultrasonic flow meter is a type of flow meter that measures the velocity of a fluid by using the principle of ultrasound. Using ultrasonic transducers, the flow meter can measure the average velocity along the path of an emitted beam of ultrasound, by averaging the difference in measured transit time between the pulses of ultrasound propagating into and against the direction of the flow.

SUMMARY OF THE INVENTION

According to an exemplary embodiment of the present invention, an ultrasonic transducer includes a piezoelectric element that is coated with a plastic film, a support ring that holds the piezoelectric element, a flange, and a spoke. One end of the spoke is connected to the support ring and an opposing end of the spoke is connected to an inner surface of the flange.

According to an exemplary embodiment of the present invention, an ultrasonic transducer includes a piezoelectric element that is coated with a plastic film, a clamp that holds the piezoelectric element, a metal support ring that holds the clamp, a flange, a spoke, and an electrically conductive wire. One end of the spoke is connected to the support ring and an opposing end of the spoke is connected to an inner surface of the flange. The wire is connected to a terminal of the piezoelectric element. The wire is located within the spoke and the flange, and is accessible via an opening on an outer surface of the flange. A sonic impedance of the clamp is less than that of the metal support ring.

According to an exemplary embodiment of the present invention, a flow meter includes an upstream flange and a downstream flange. Each flange includes a transducer assembly that comprises a piezoelectric element coated with plastic, a support ring that holds the piezoelectric element, and a spoke. One end of the spoke is connected to the support ring and an opposing end of the spoke is connected to an inner surface of the flange.

According to an exemplary embodiment of the present invention, each flange includes a transducer assembly that comprises a piezoelectric element, a clamp that holds the piezoelectric element, a metal support ring that holds the clamp, a spoke, and an electrically conductive wire. A sonic impedance of the clamp is less than that of the metal support ring. One end of the spoke is connected to the support ring and an opposing end of the spoke is connected to an inner surface of the flange. The wire is connected to a terminal of the piezoelectric element. The wire is located within the spoke and the flange, and is accessible via an opening on an outer surface of the flange.

According to an exemplary embodiment of the invention, a pipe includes first and second rings. The first ring supports a first piezoelectric element that is coated with a plastic film. The first ring is connected to an inner surface of the flange via a first spoke. The second ring supports a second piezoelectric element that is coated with the plastic film. The second ring is connected to an opposing inner surface of the flange via a second spoke.

According to an exemplary embodiment of the invention, a ultrasonic transducer includes, a piezoelectric element attached to a sonic lens, a support ring that holds the piezoelectric element, a flange, and a spoke. One end of the spoke is connected to the support ring and an opposing end of the spoke is connected to an inner surface of the flange. In an embodiment, the sonic lens is a plastic film that coats the piezoelectric element and has a ¼ wavelength thickness. In an embodiment, the piezoelectric element is located with its center at a position of ½ the inside radius of a pipe, flange, or spool section.

The ultrasonic transducer may further include a second piezoelectric element housed in a second support ring, where the second support ring is connected to a second inner surface of the flange via a second spoke. In an embodiment, the piezoelectric element is located along a radius of the flange at a distance away from the inner surface that is substantially one half the radius, and the second piezoelectric element is located along an opposite radius of the flange at a distance away from the second inner surface that is substantially one half the opposite radius. In a further embodiment, each piezoelectric element is oriented to output a sonic beam at about a 45 degree angle to the axis of a pipe, where one beam goes clockwise and the other goes counterclockwise. In alternate embodiments, the 45 degree angle may be replaced with any angle between 30 and 60 degrees.

According to an exemplary embodiment of the invention, a flow meter includes an upstream flange and a downstream flange. Each flange includes a transducer assembly that comprises a piezoelectric element attached to a sonic lens, a support ring that holds the piezoelectric element, and a spoke. One end of the spoke is connected to the support ring and an opposing end of the spoke is connected to an inner surface of the flange. In an embodiment, the sonic lens is a plastic film having a ¼ wavelength thickness that coats the piezoelectric element.

In an embodiment, each flange includes a second one of the transducer assemblies, wherein a length of each spoke of each transducer assembly is set so that each piezoelectric element is at a distance of one half radius of the corresponding flange of a spool section of a pipe attached to the flange.

In an embodiment, each of the two piezoelectric elements is oriented to output a sonic beam at substantially a 30 degree circumferential angle below a horizontal centerline of a pipe attached to the flange.

According to an exemplary embodiment of the invention, a flange for a pipe includes a first ring supporting a first piezoelectric element that is attached to a first sonic lens, where the first ring is connected to an inner surface of the flange via a first spoke, and a second ring supporting a second piezoelectric element that is attached to a second sonic lens, where the second ring is connected to an opposing inner surface of the flange via a second spoke.

In an embodiment, each piezoelectric element is arranged at a distance of about one half the inside radius of the flange. In an embodiment, each piezoelectric element is arranged to transmit a sonic beam at an angle of about 45 degrees in rotational directions that oppose one another. In an embodiment, each sonic lens is a plastic film having a ¼ wavelength thickness that coats the respective piezoelectric element.

BRIEF DESCRIPTION OF THE DRAWINGS

Exemplary embodiments of the invention can be understood in more detail from the following descriptions taken in conjunction with the accompanying drawings in which:

FIG. 4d illustrates an example of a configuration of transducer assemblies to generate chordal beams according to an exemplary embodiment of the invention.

DETAILED DESCRIPTION

Exemplary embodiments of the present invention will be described below in more detail with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
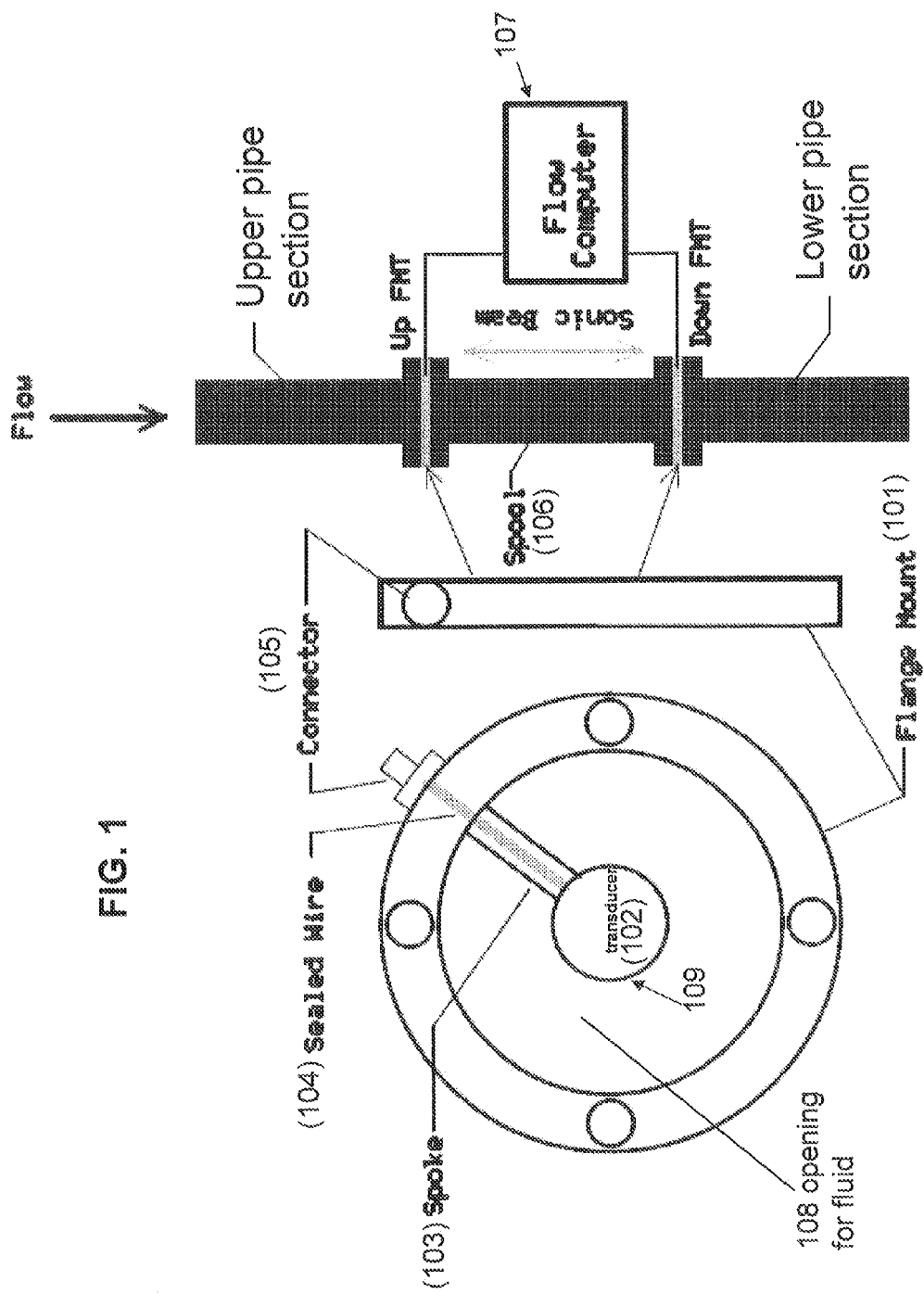
FIG. 1 illustrates a system for measuring flow of a fluid according to an exemplary embodiment of the invention.

FIG. 1 illustrates a system for measuring flow of a fluid according to an exemplary embodiment of the invention. The system includes at least two flanges 101. In an embodiment, each flange 101 is ring shaped. The flange 101 may be sized to be equivalent in size to flanges that are normally found on typical pipes of a given diameter and standard. Each flange 101 includes an ultrasonic transducer 102, a spoke 103 (e.g., a rod), a wire 104, and a connector 105. In an embodiment, the flange 101 (e.g., a pipe flange) is a disc, collar or ring that is attached to one an end of a pipe or affixes ends of two pipes together. The flange 101 may be secured to a pipe by welding, screws, bolts, etc.

In an embodiment, the ultrasonic transducer 102 is a piezoelectric transducer, which includes either at least one piezoelectric crystal (e.g., quartz) or at least one section of a piezoelectric ceramic. A piezoelectric transducer converts electrical signals into mechanical vibrations (transmit mode) and mechanical vibrations into electrical signals (receive mode). The ultrasonic transducer 102 is mounted within a housing 109. The crystal or ceramic is selected to have a thickness and diameter consistent with a desired operating frequency. In an embodiment, electrically conductive tabs or terminals are affixed to both sides (faces) of the crystal or ceramic. In an embodiment, a low impedance material (e.g., a chemically resistant strong plastic) is bonded to both sides (e.g., opposing sides) of the crystal or ceramic and the conductive tabs extend through the material. In an embodiment, this low impedance material entirely surrounds the crystal or ceramic and the tabs.

In an alternate embodiment, a sonic lens is affixed to the crystal or ceramic. The sonic lens may be a concave plastic surface that focuses a sonic beam generated by the crystal or ceramic to some degree so that it does not spread too much as it is reflected off a pipe or spool section while travelling between up and down stream transducers. In an embodiment, the sonic lens is about ¼ inch thick or is a ¼ wavelength thickness. In an embodiment, the sonic lens is concave or convex as it could be used to serve to protect the crystal or ceramic from damage if there is debris in the flow stream. Further, in an alternate embodiment, the above-described plastic film coats the crystal or ceramic, and is shaped and configured to act as the above-described sonic lens.

In an embodiment, the tabs are located within the spoke 103 to allow the wires to be completely covered to prevent them from being exposed to the flowing medium.

In an embodiment, the plastic is Delrin. The plastic may be selected to have a sonic impedance as close as possible to the geometric mean of the sonic impedance of the fluid that is passes through the pipe and the crystal. In embodiment, the thickness of the plastic in front of the crystal is one half wave of the selected frequency, and the rear of the crystal is shaped to reduce the obstruction of flow and to maximize the mixing of flow on the downstream side to reduce or eliminate the effect flow profile.

In an embodiment, the housing 109 comprises a material of low sonic impedance. In the embodiment shown in FIG. 1, the housing 109 is connected to a single spoke 103 that is affixed to the flange 102. In an embodiment, the spoke 103 is made of metal. The spoke 103 provides support for the housing 109. In an embodiment, the spoke 103 is a hollow cylinder. One or more conductive wires 104 pass through the housing 109 to connect to the ultrasonic transducer 102, pass through the spoke 103 (e.g., the hollow portion), enter one side of the flange 101 (e.g., an inner surface), and pass through the flange 101 (e.g., through an opening on its outer surface) to connect to a conductive connector 105 (e.g., a terminal) mounted to another side (e.g., an opposing side) of the flange 101. For example, the wires 104 may be connected to the electrically conductive tabs of the ultrasonic transducer 102.

For convenience, the flange 101, ultrasonic transducer 102, spoke 103, wire 104, and connector 105 are collectively referred to as "flange mounted transducer" or RAT. The connector 105 is optional. One FMT (e.g., an Upstream FMT or Up FMT) is used to secure an upper section of pipe to a spool 106 section of pipe and another FMT (e.g., a Downstream FMT or Down FMT) is used to secure a lower section of pipe to the spool 106 section. The transducers 102 installed in the upstream and downstream FMTs enable the measurement of the difference in the upstream and downstream time of flight measurements to generate a flow rate for the pipe. The pair of FMTs and the spool 106 section therebetween may be referred to as a Flow Sensing Section (FSS).

The pair of FMTs creates a path for a sonic beam to pass through the flowing medium in the pipe, whereby the flow of the medium can affect the time difference taken by the sonic beam to travel upstream and downstream between the pair of transducers 102. The difference of measured travel time between upstream and downstream sonic pulses is proportional to the flow rate of the medium, and the absolute travel time may represent a parameter such as the medium's density, while the variation of signal amplitude and travel time may represent medium properties or inclusion of non-homogenous materials.

The angular position of the pair of transducers 102 may be selected to create a direct axial path between the upstream and downstream transducers. Alternatively, the transducers 102 may be positioned to reflect the sonic beams along diametric or chordal paths between the upstream and downstream transducers to interrogate a relatively larger percentage of the volumetrically significant flow detection regions of the pipe, resulting in insensitivity to variations of flow profile, and independence from the aberrations of the flow profile. The flow profile explains the way in which the flow of a fluid behaves or is likely to behave in a pipeline based on its velocity and viscosity.

The selection of path type is effected by mathematically appropriate selection of the radial position of the center of each transducer pair and the rotation angle of the crystal or piezoelectric ceramic relative to the axis of the pipe so as create an axial sonic beam path, or direct sonic reflections off the pipe wall along diametric or chordal paths. Directing the chordal paths of two sets of transducers 102 in opposite directions may minimize the effects of swirl or cross-flow. Depending on the application conditions, a combination of the Axial, Diametric and Chordal paths may be utilized to achieve a desired performance level.

In an embodiment, the spool 106 section of pipe is connected to the upper and lower section of pipe via standard flanges that do not include the section including the ultrasonic sensor 102, spoke 103, and connector 105. In this embodiment, the existing upstream and downstream flanges are disconnected from the spool 106 section. Then one FMT is connected between the upstream flange and one end of the spool 106 section and another FMT is connected between the downstream flange and the other end of the spool 106 section.

A computer (e.g., a flow computer) 107 or microprocessor is configured to receive inputs from at least two FMTs (e.g., the Up FMT and the Down FMT), and transmit a signal to each FMT via the connector 105 and the wire 104. When the connectors 105 are not present, the computer 107 is configured to connect directly to the wires 104. The area between the flange 101 and the transducer 102 is an opening 108, which allows fluid such as a gas or a liquid to pass.

The computer 107 is configured to output a signal to each FMT, which causes the corresponding transducer 102 to produce pulses of the frequency, duration, and amplitude necessary to excite the transducer FMT into its transmission mode. In the transmission mode, the transducer 102 generates a sonic signal. For example, the transducer 102 of the Down FMT can generate a sonic signal that travels though the spool 106, which is received by the Up FMT, and the transducer 102 of the Up FMT can generate a sonic signal that travels though the spool 106, which is received by the Down FMT.

Figure 5:
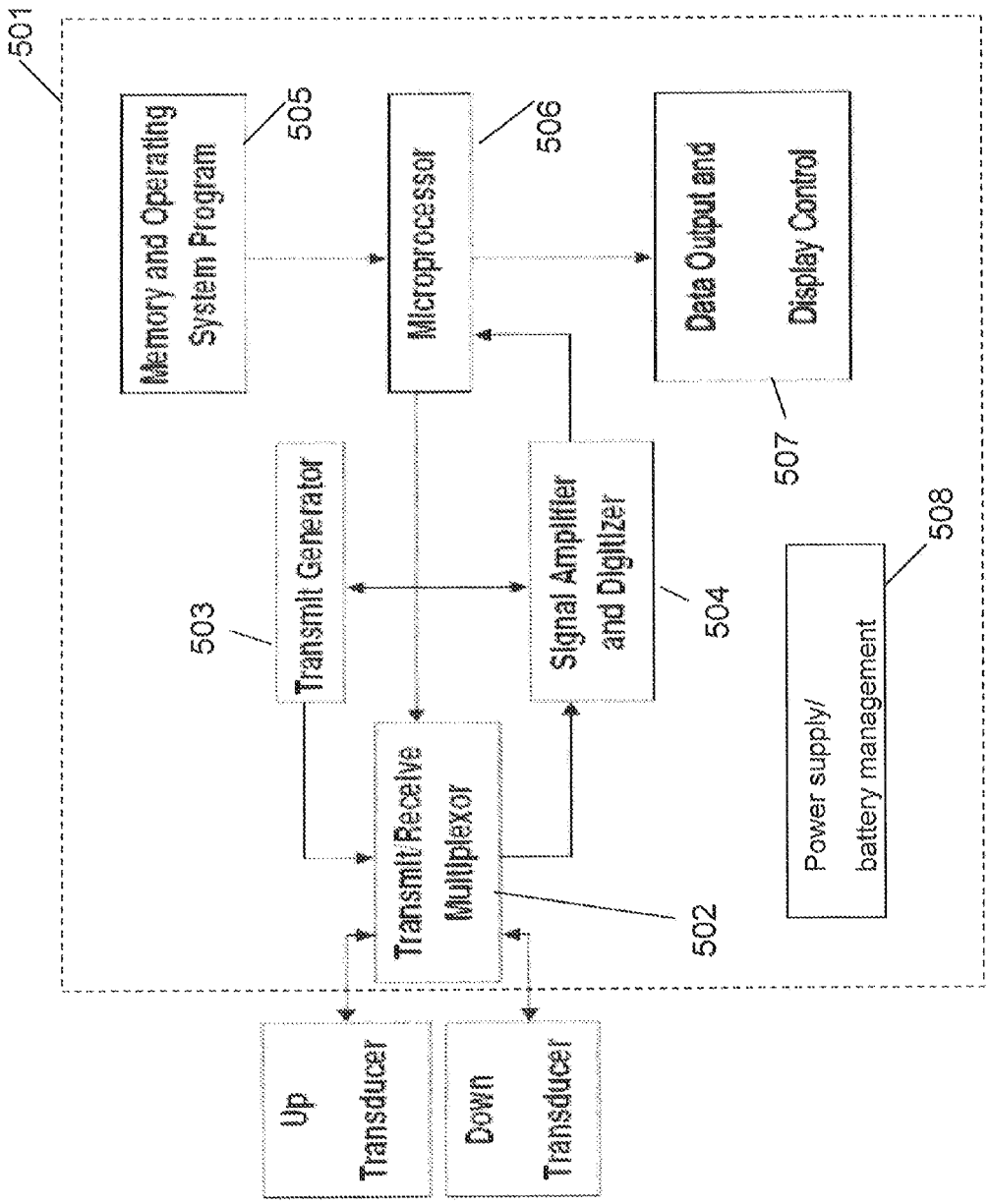
FIG. 5 illustrates an example of a system that may be used to compute a flow rate based a configuration of the transducer assemblies according to an exemplary embodiment of the invention.

In an embodiment, the computer 107 includes means to amplify the sonic signal received after passage through the spool 106 (e.g., containing a gas or liquid) between adjacent FMTs (e.g., see amplifier 504 in FIG. 5). In an embodiment, the computer 107 includes a high frequency clock that is gated to a first counter that counts the time of transit of a sonic signal from the Down FMT to the Up FMT and a second counter that counts the time of transit of a sonic signal from the Up FMT and the Down FMT. For example, the time of transit may correspond to a difference between the time of output of the sonic signal by one of the FMTs and the time of receipt by the other FMT.

In an embodiment, the computer 107 is configured to provide a signal to an FMT that causes its transducer 102 to reverse its transmission direction on each transmission cycle, or to maintain transmission in a given direction for many pulses, and then reverse direction. The computer 107 can perform these adjustments by maintaining counts in separate counters based on the same number of transmission cycles.

When a sufficient number of cycles have been collected to achieve both a desired count resolution and averaging of flow rate for the selected interval of time, the difference in the count total in each of the upstream and downstream counters may be subtracted from each other to generate a net count that is proportional to the flow rate. In an embodiment, the counts from more than one path can be integrated. Further, the computer 107 can separately measure the flow rate in different FMT equipped spools, by multiplexing the services of counting and determining flow rate for each such spool.

In an embodiment, the flow computer 107 is configured to gather information on the condition of the gas or liquid itself using the transmission times. For example, a sonic propagation velocity may be determined from the average of the upstream and downstream transmission times. Further, the flow computer 107 may be configured to determine a variation in received sonic gas signal amplitude, which can be attributed to the inclusion of undesired liquid droplets or of actual included solid materials. Moreover, the computer 107 may be configured to detect malfunctions of upstream and downstream equipment, such as pumps and valves by analyzing the time variation of measured flow velocity as well as signal amplitude.

Figure 2:
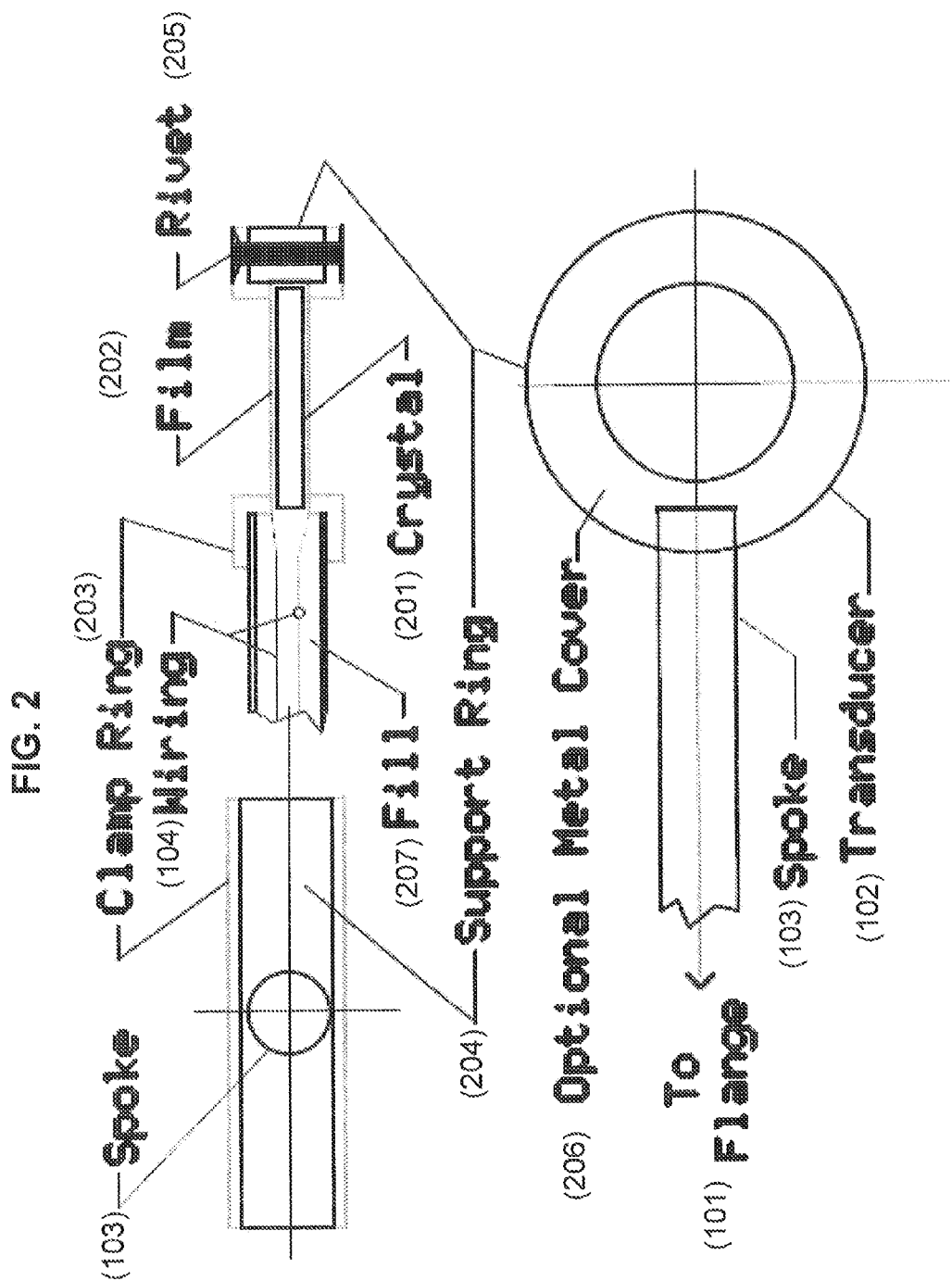
FIG. 2 illustrates a transducer assembly of the system of FIG. 1 according to an exemplary embodiment of the invention.

FIG. 2 illustrates an example of the housing 109 and spoke 103 of FIG. 1 according to an exemplary embodiment of the invention. FIG. 2 will be described with respect to a transducer 102 that includes a crystal 201. In an embodiment, the crystal 201 is chosen with a diameter to thickness ratio that permits development of a sonic beam with low lateral dispersion. As a result, a small diameter pipe may not physically support a transducer of a frequency which gives a satisfactory physical size. In such a circumstance, a higher frequency permits a more satisfactory physical size. Such an increase in frequency for small pipes allows for a greater resolution of arrival time detection. Accordingly, it aids in achieving high arrival time detection accuracy needed to achieve overall flow detection accuracy as the time difference produced by a given flow velocity is reduced as the path length is reduced. In alternate embodiments, the crystal 201 may be replaced with a piezoelectric ceramic.

Referring to FIG. 2, the crystal 201 is coated with a plastic film 202. Although not shown in FIG. 2, electrically conductive tabs are connected to opposing faces of the crystal 201 and extend through the plastic film 202. In an embodiment, the plastic film 202 is a low impedance material with ¼ wavelength thickness. A wavelength refers to the distance that sound will travel in any medium over the amount of time that it takes for one cycle of the propagating frequency to be completed. Since the speed of sound in different mediums is unique to that medium, the wavelength for each medium is unique, unless it has the same sonic velocity as some other substance. If the frequency of the crystal/ceramic 201 is 1 megahertz, and sound travels within the film 202 at 60,000 inches per second, then sound travels 60,000/1,000,000=0.06 inches in 1 microsecond=1 wavelength. In this example, film 202 of ¼ thickness would have a thickness of 0.06/4=0.015 inches. The thickness of the film 202 can vary based on the sonic properties of the material chosen for the film 202 and the frequency of the crystal 201. Thus, embodiments of the invention are not limited to any particular crystal frequency or film 202 thickness. In an embodiment, the film 202 is applied in layers of at least one sheet.

The crystal 201 coated with the film 202 and including the conductive tabs may be collectively referred to as a crystal assembly. A plastic clamping ring 203 is clamped around the crystal assembly to hold the crystal 201 in place. The clamping ring 203 can be adjusted to apply pressure to the crystal 201.

The clamping ring 203 (including the crystal assembly) is then mounted within a metal support ring 204. The metal support ring 204 is an embodiment of the above-described housing 109, which is affixed to the spoke 103. The diameter of the support ring 204 is larger in diameter than the crystal 201 to allow the clamping ring 203 to fit within the support ring 204 while clamping the crystal 201 in place. The clamping ring 203 holds the crystal 201 in place in such a way that the crystal 201 is separated from the support ring 204.

In an embodiment, the clamping ring 203 is made of a low sonic impedance material, which may minimize the transference of sonic vibration of the crystal 201 to the metal support ring 204. In this way, the crystal 201 is isolated from the support ring 204 and hence from the flange 101 and the other pipe sections. Accordingly, it may be possible to minimize transmit sonic energy entering the spool 206 section, where it would otherwise travel to the receive transducer and interfere with accurate detection of the arrival time of the signal arriving through the fluid (e.g., gas or liquid) medium inside the pipe.

In an embodiment, the clamping ring 203 is secured to the support ring 204 by screws, rivets 205, or by any other means that permit the clamping ring 203 to apply pressure to the crystal 201 to hold the crystal 201 in place. In applications where particulate material may erode the clamping ring 203, a thin metal 206 may be affixed over the upstream side of the clamping ring 203. In an embodiment, the position of the crystal 201 within the clamping ring 203 is at a nodal position, which may help to minimize the transference of crystal vibration to the support ring 204.

In an embodiment, the support ring 204 is of a suitable thickness to permit drilling of a radial hole into which one end of the support spoke 103 will be installed. As discussed above, the other end of the spoke 103 is affixed to the flange 101. In an embodiment, the spoke 103 is a stainless steel tube through which the connecting wires 104 pass to bring a transmit signal into the crystal 201, and a receive signal out. The support ring 204 including the clamping ring 203, which includes the crystal assembly, may be referred to as the transducer assembly. In an embodiment, a radial hole in the flange 101 permits the spoke 103 to be secured to the flange 101, thereby holding the entire transducer assembly in place. The spoke 103 permits the transducer assembly to be rotated so that it may selectively face either axially down the pipe, or at any angle desired to focus the sonic beam at a desired reflection angle towards a wall of the spool 106 section. This angle may be fixed by welding or cementing the spoke 103 to the flange 101.

In an embodiment, to ensure against leakage of either gas or liquid from inside the pipe through the spoke 103, the spoke 103 may be filled with a fill 207 material that solidifies. The fill 207 material may be chosen so that it aids in dissipating any sonic energy that could enter the spoke 103 via the clamping ring 203 or support ring 204. In an embodiment, the fill 207 material is a sound absorbent material. In an embodiment, the outside of the spoke 103 is coated with a sound absorbent material (e.g., duct tape).

Figure 3:
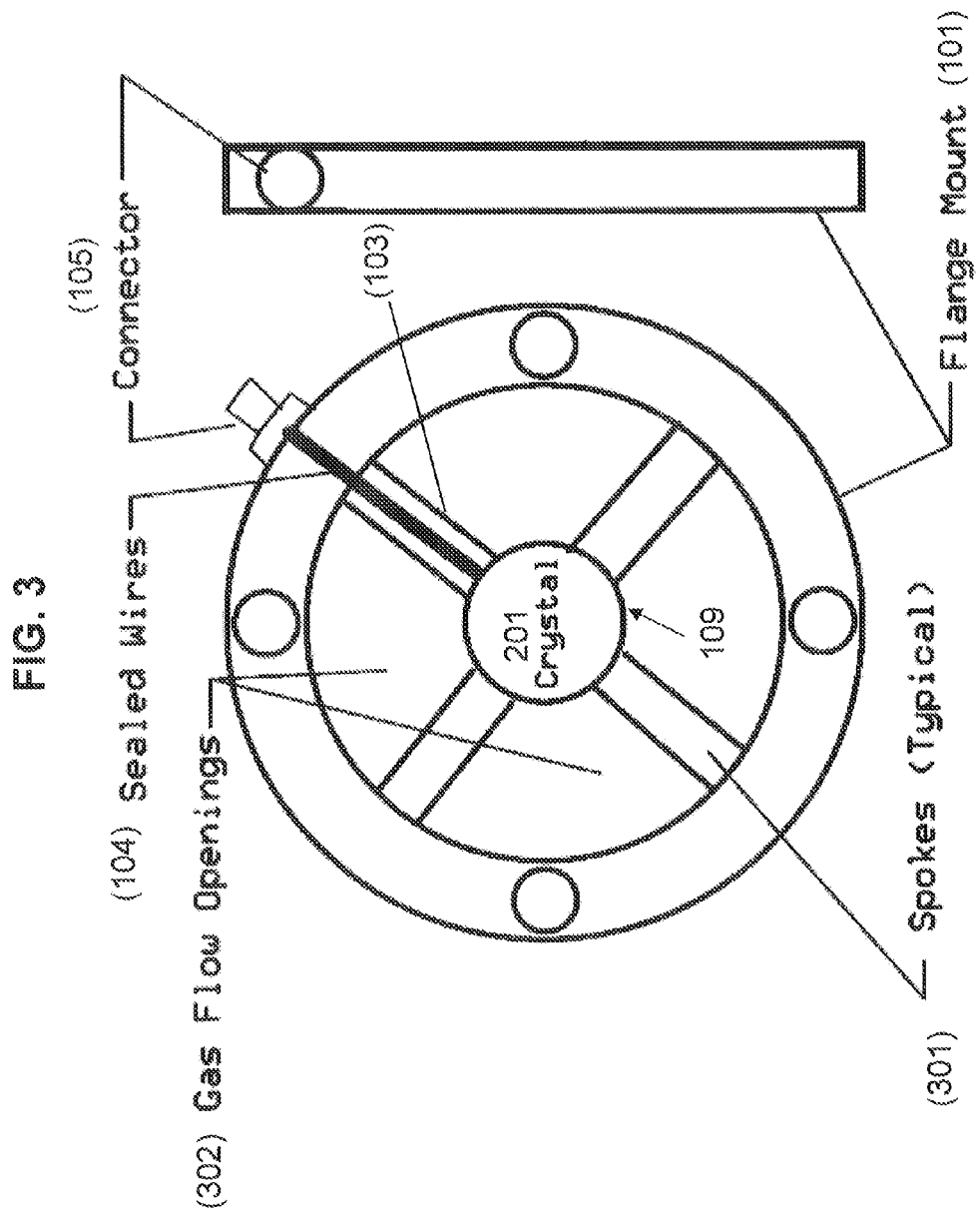
FIG. 3 illustrates the transducer assembly mounted in a flange according to an exemplary embodiment of the invention.

While FIG. 1 shows one transducer assembly mounted within a flange 101, in alternate embodiments additional transducer assemblies are mounted within the flange 101. FIG. 3 illustrates an alternate embodiment where the housing 109, which includes the crystal assembly is mounted to spoke 103 and additionally to three spokes 301, which are each mounted to a different inside surface of the flange 101. Due to the additional spokes 301, four openings 302 are present that allow the passage of a fluid (e.g., a gas or liquid). While FIG. 3 shows use of a crystal 201, in alternate embodiments it can be replaced with a piezoelectric ceramic.

In an alternate embodiment, only one of the three spokes 301 is present (e.g., the one opposing the spoke 103 that includes wires 104). In an alternate embodiment of the invention, at least one of the spokes 301 is replaced with a spoke like spoke 103. For example, another connector 105 may be connected to the flange 101 at a position corresponding to the modified spoke 301, and wires may be added that pass through the modified spoke 301 to connect to the crystal 201 and the added connector. In this way, there is added flexibility, since a user can connect to either of the connectors 105 to control the transducer assembly. Further, by using the modified spoke 301, a wire from one connector 105 to the crystal 201 can be used to transmit signals to the crystal, while another wire from the other connector 105 can be used to receive signals.

Figure 4A:
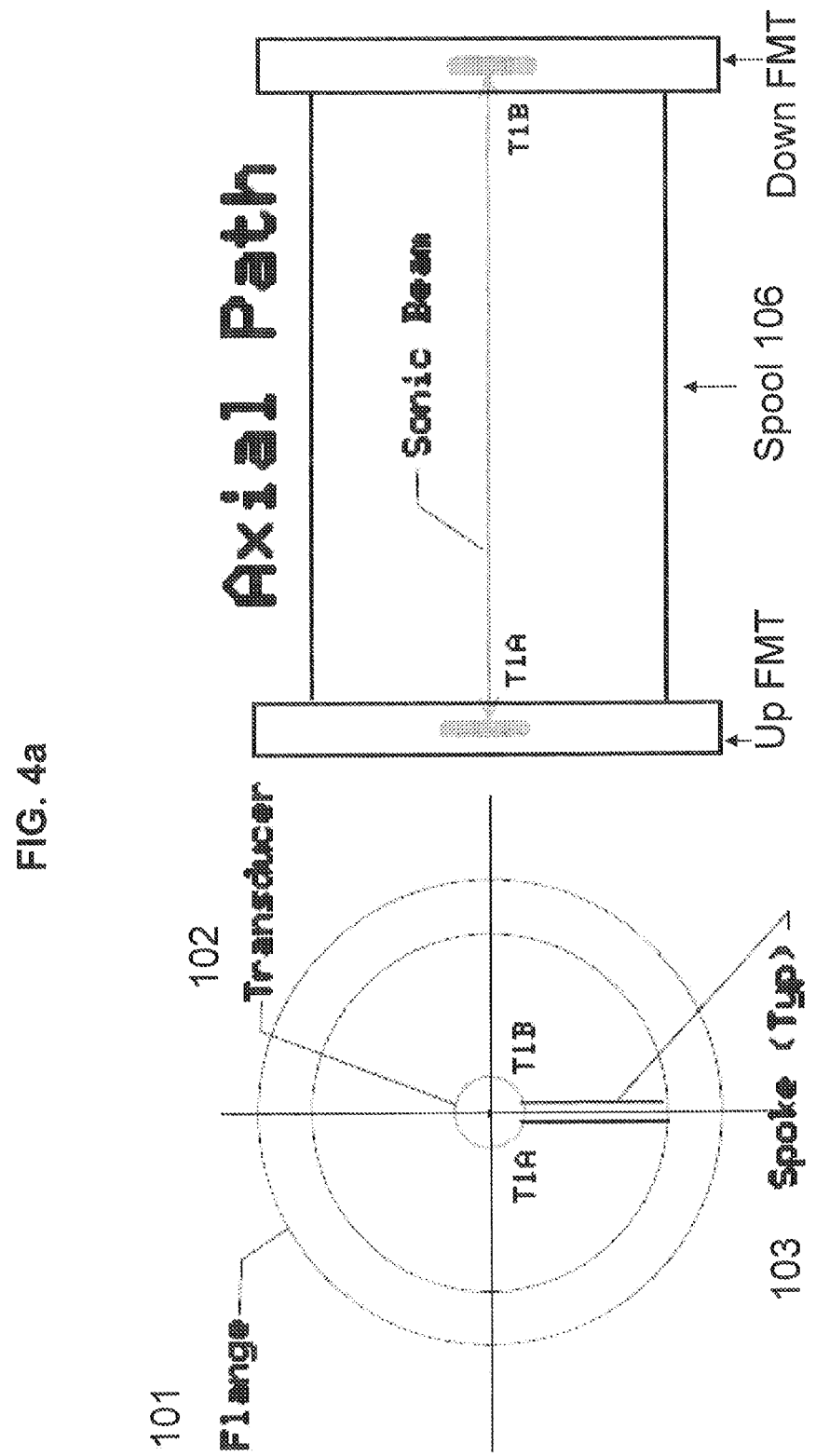
FIG. 4a illustrates an example of a configuration of transducer assemblies for generating an axial beam according to an exemplary embodiment of the invention.

FIG. 4a illustrates an embodiment of the invention, where an upstream and down stream RAT are configured to provide an axial or direct sonic beam in line with the axis of the spool 106 section and at the same position in the upstream and downstream FMT. As such, the upstream transducer is normal to the flow stream, causes a complex disturbance in the flow profile, and blocks the flow in the region directly behind this transducer. However, when the spool 106 section is long, the region is relatively small, and should not unduly affect accuracy. While FIG. 4a shows that the transducers 102 are centered within their respective flanges 101 and located to project a sonic beam that is centered within the spool 106, embodiments of the invention are not limited thereto. For example, in alternate embodiments of the invention, the transducers 102 may be offset some distance from the center of their respective flanges 101, and/or located to project a sonic beam that is offset some distance from the center of the spool 106. For example, the length of the spoke 103 can be lengthened or shortened to bring the crystal assembly a distance away from the center.

Using the pair of FMTs in the axial configuration may reduce or eliminate beam blowing effects, which occurs with angulated beams. Accordingly, this configuration may permit operation at very high flow velocities. For example, at least one embodiment of the invention that uses this configuration may permit operation at the speed of sound within the medium itself. Where the medium flows at very high velocities, and is dense such as in the case of water or oil, additional support can be added to the support ring 204 to handle the stress of the impact of the fluid on the transducer assembly. However, since a direct beam senses flow only it its own axial path, it may not be fully representative of the average flow in the spool 106.

Figure 4B:
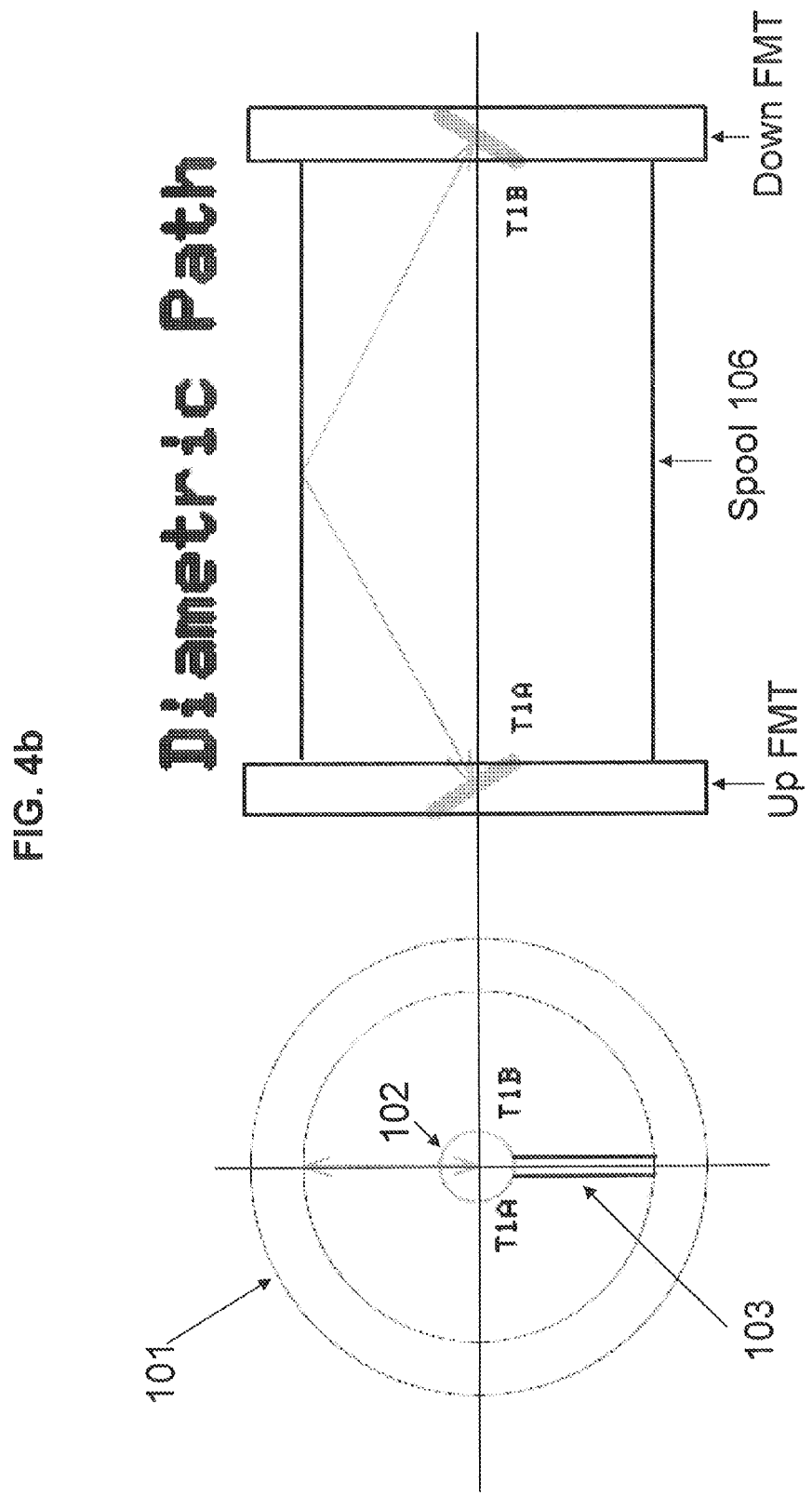
FIG. 4b illustrates an example of a configuration of transducer assemblies for generating a diametric beam according to an exemplary embodiment of the invention.

FIG. 4b illustrates an embodiment of the invention where the upstream and downstream FMTs are configured to generate a diametric beam. The diametric beam is generated by locating the center of each transducer 102 in the center of each corresponding flange 101, and rotating each transducer 102 so that the beam will intersect the wall of the spool 106 at a point midway between the spool's flange, and reflect so at to pass through the center of the spool. The angle of the transducer 209 determines the distance from the flange 101 that the beam will strike the spool 106. The distance is half the resultant length of the spool 106 required to intercept the beam with the second of the pair of transducers. More than one reflection can be achieved by appropriately increasing the length of the spool 106, and with a reversal of the second transducer's angle, even if an even number of such reflections are intended.

When a pair of the FMTs is configured to generate a diametric beam, the beam may be configured to pass through the entire flow profile. Accordingly, as compared to the axial configuration, the resulting flow measurement may be more representative of the actual flow rate, and more resistance to flow profile aberration errors. However, dependent on the angle of the transducer 102, the diametric beam may be more susceptible to loss of beam reception than the axial beam, due to beam blowing at high flow velocities. A shallower angle, and consequently a long spool 106 is less susceptible to beam blowing since the longer beam is less likely to miss arrival the receive transducer.

As a consequence of being reflected off the curved interior of the pipe, the reflected beam is elongated in the axial direction and compressed in the radial direction. The former effect reduces the vulnerability to beam blowing, and the latter effect serves to increase the received signal's strength through a focusing effect.

Figure 4C:
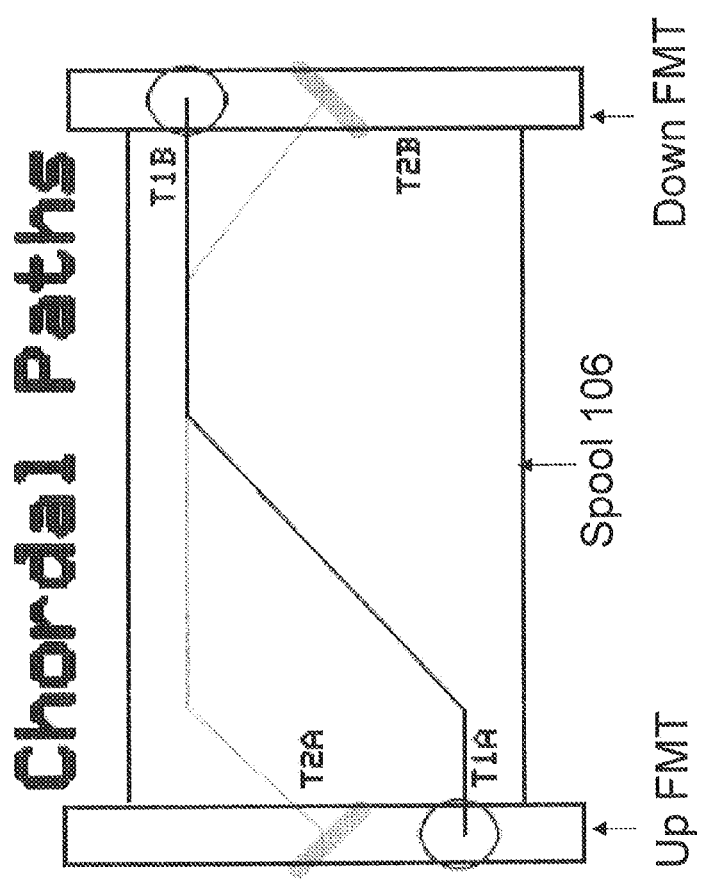
FIG. 4c illustrates an example of a configuration of transducer assemblies to generate chordal beams according to an exemplary embodiment of the invention.
Figure 4C:
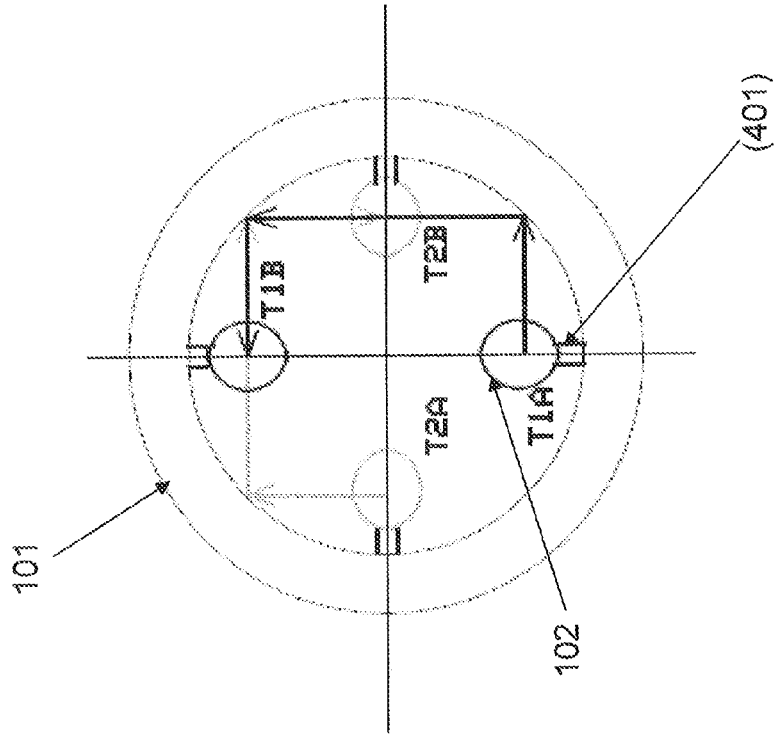

FIG. 4c illustrates an embodiment of the invention where the upstream and downstream FMTs are configured to generate a chordal beam. The chordal beam is created by moving the center of the transducer to a radius offset from the center of the flange 101. For example, the length of the spoke 103 of FIG. 1 can be reduced to generate the shortened spoke 401 shown in FIG. 4c. In an embodiment, the center of the transducer 102 is moved to a distance of the radius/$\sqrt{2}$.

With the spoke 401 at an angle of 45 degrees from the plane of the flange 101, the sonic beam follows the paths illustrated in FIG. 4c. In completing the two reflections supported by this configuration, a single pair of the transducers produces three Chordal paths. As shown by FIG. 4c, the sonic beam transits the flow profile between a radius of 0.707R and R. The area average effectiveness of the sonic beam thus varies between 75% and 100% of maximum possible. In combination with passage through most of the flow profile, the Chordal Beam configuration combines great resistance to errors due to changes in flow profile along with increased calibration stability resultant from the direct measurement of flow in 75% of the actual flow stream. Two counter-propagating Chordal Beams may mitigate both axial and rotational swirl, as well as cross-flow, which may be present when an FMT is located near a bend or elbow. Accordingly, in at least one embodiment, Chordal paths are used in pairs.

FIG. 4d illustrates another configuration of transducer assemblies according to an exemplary embodiment of the invention with an upstream and downstream FMT that makes use of chordal beams. The lower left section of FIG. 4d illustrates a view from the upstream position (e.g., from the Up FMT) as if the observer were inside the pipe that is connected between the upstream and downstream FMTs.

The receive transducers are downstream (e.g., in the down FMT), but shown as if they were next to the upstream transducer. In each FMT, two transducers (e.g., 102) are located at a radial position of R, where R is the radius of the inside of the pipe. Both the upstream transducers are facing downstream at an angle of 45 degrees, one directing sonic beams at a clockwise rotational angle and the other directing sonic beams at counter-clockwise rotational angle. For example, in an embodiment, a sonic lens of one of the upstream transducers faces in one direction and a sonic lens of the other transducer faces in the opposite direction. In an embodiment, one of the upstream transducers is located at about ½ of an inside radius of a pipe, while the other one of the upstream transducers is located at about ½ of an opposite inside radius of the pipe. This configuration may prevent a swirl from developing in the fluid (e.g., gas, liquid, etc.) of the pipe, and may mix up the flow stream and help to flatten the flow profile.

In the embodiment shown in FIG. 4d, the transducers direct their sonic beams at the pipe wall at an angle that is about 30 degree circumferential angle below the horizontal centerline of the pipe. The transducers may be pointed downstream at any angle. In an embodiment, this downstream angle is 45 degrees, while downstream angles from about 30 degrees to about 60 degrees are practical.

In an embodiment, when the beam hits the wall it reflects at a downstream angle of 45 degrees, in combination with a chordal angle of 60 degrees. This forms a Star of David pattern, which keeps the beam in the radial positions of from 50% of the Radius to 100% of the radius. This may insure that the beam measures flow in the major regions of flow. Note that the volume that flows within a radius of 50% R is only ¼ of the total volume. Also by passing through many different radii, the average flow rates may be more accurate than if it was restricted to one location.

In the embodiment shown in FIG. 4d, since the sonic beam may travel at a radius of between ½ the radius R of the pipe and R, it can avoid passage through the high velocity center of the pipe. The configuration shown in FIG. 4d may be used to compute volumetric flow rate independent of the shape of the flow profile. Thus, a meter using such a configuration that is calibrated using one medium (e.g., water) can be used on a very different medium (e.g., a very viscous oil).

In another exemplary embodiment, a flow sensing section (e.g., a spool, an upstream FMT, and a downstream FMT) is equipped with a combination of the above-described configurations (e.g., axial and chordal beams, chordal and diametric, diametric and axial, or all three). For example, a first transducer 102 may be connected to a spoke 103 and a flange 101 for generating the axial beam, and a second transducer 102 may be connected to a spoke 401 and another side of the flange 101 for generating the chordal beam. Each path of a different type has its own scale factor, dependent on path length and angle to the axis of the pipe that each path generates. In at least one embodiment, only one calibration factor need be applied to the combinatorial sum of individual beam contributions.

FIG. 5 illustrates an example of a system 501 that may be used to compute the flow rate in a pipe that is equipped with the above-described transducer assemblies. The system 501 of FIG. 5 may be the computer 107 shown in FIG. 1. The up transducer shown in FIG. 5 may correspond to a transducer 102 of an upstream FMT and the down transducer shown in FIG. 5 may correspond to a transducer 102 of a downstream FMT. The system 501 includes a transmit/receive multiplexer 502, a transmit generator, a signal amplifier and digitizer 504, a memory 505, a microprocessor 506, a display 507, and a power supply 508. The memory 505 may include an operating system program, a program to control operation of the transducers, a routine for calculating flow rates based on arrival times, and/or a routine to calculate other parameters from the flow rates or from the arrival times.

The microprocessor 506 is configured to execute the operating system and the routines. The transmit generator 503 may be directed by microprocessor 506 to output a signal to a transducer 102, which causes the transducer to output a sonic beam. The signal may be output to the transmit/receive multiplexer 502, which is controlled by the microprocessor 506. When the up transducer is to be activated to generate a sonic signal, the microprocessor 506 is configured to output a first control signal to the multiplexer 502 so that the signal output by the transmit generator 503 is output to the up transducer. When the down transducer is to be activated to generate a sonic signal, the microprocessor 506 is configured to output a second other control signal to the multiplexer 502 so that the signal output by the transmit generator 503 is output to the down transducer. In an embodiment, the multiplexer 502 is split into two separate multiplexers, where one is used to transmit signals, and the other is used to receive signals.

The up and down transducers generate a voltage in response to receipt of a sonic signal, and output this voltage to the multiplexer 502. The microprocessor 506 may be configured to periodically poll the multiplexer 502 for these voltages by sending a third control signal to the multiplexer 502 to receive the output voltage of the up transducer, and a fourth control signal to the multiplexer 502 to receive the output voltage of the down transducer. These output voltages can be fed to the signal amplifier and digitizer 504 for amplification and conversion to a digital signal. These digital signals may be output by the digitizer 504 to the microprocessor 506 for calculation of the flow rate or some other parameter based on the flow rate. The flow rate may be viewed on the display 507 as a tabular value or graphically. The power supply 508 provides power to the system and may include a unit for managing battery power.

A flange mounted transducer according to at least one embodiment of the invention may increase the amount of energy introduced into a fluid (e.g., gas) stream of a pipe, while simultaneously reducing the amount of sonic energy introduced into the pipe and other supporting structures (e.g., a flange). This may result in an improved signal to noise ratio as compared to transducers that are inserted into a cavities within the pipe. The improved signal to noise ratio may result in better flow measurement accuracy and faster detection of changes in flow rate, which enables quicker reaction to changes in flow velocity that could cause destructive stress on system integrity. The flange mounted transducer may improve performance of high and low pressure flow measurements.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the disclosure.

What is claimed is:

1. An ultrasonic transducer comprising:
   a piezoelectric element attached to a sonic lens;
   a support ring that holds the piezoelectric element;
   a flange; and
   a spoke, wherein one end of the spoke is connected to the support ring and an opposing end of the spoke is connected to an inner surface of the flange.

2. The ultrasonic transducer of claim 1, wherein the support ring is metal, and the support ring surrounds a clamp that surrounds the piezoelectric element, wherein a sonic impedance of the clamp is less than that of the metal support ring.

3. The ultrasonic transducer of claim 2, wherein the clamp is made of plastic.

4. The ultrasonic transducer of claim 1, further comprising an electrically conductive wire connected to a terminal of the piezoelectric element, wherein the wire is located within the spoke and the flange, and is accessible via an opening on an outer surface of the flange.

5. The ultrasonic transducer of claim 4, further comprising an electrically conductive connecter located within the opening and connected to the wire.

6. The ultrasonic transducer of claim 4, wherein the spoke includes a cavity and the wire is located within the cavity.

7. The ultrasonic transducer of claim 6, wherein the cavity includes a sound absorbent material.

8. The ultrasonic transducer of claim 1, wherein the piezoelectric element is one of a crystal or a ceramic.

9. The ultrasonic transducer of claim 1, wherein the sonic lens is a plastic film that coats the piezoelectric element and has a ¼ wavelength thickness.

10. The ultrasonic transducer of claim 1, wherein the piezoelectric element is located substantially at the radial center of the flange.

11. The ultrasonic transducer of claim 1, wherein the piezoelectric element is arranged to output a sonic beam at one of an axial path, a diametric path, and/or a chordal path within the flange.

12. The ultrasonic transducer of claim 1, wherein the piezoelectric element is located along a radius of the flange at a distance away from the inner surface of the flange that is less than the radius.

13. The ultrasonic transducer of claim 12, wherein the piezoelectric element is located with its center at a position of ½ the inside radius of a pipe, flange, or spool section.

14. The ultrasonic transducer of claim 1, further comprising a second piezoelectric element housed in a second support ring, wherein the second support ring is connected to a second inner surface of the flange via a second spoke.

15. The ultrasonic transducer of claim 14, wherein one of the piezoelectric elements is arranged to transmit a sonic beam along an axial path, and the other is arranged to send a sonic beam along a chordal path.

16. The ultrasonic transducer of claim 14, wherein the piezoelectric element is located along a radius of the flange at a distance away from the inner surface that is substantially one half the radius, and the second piezoelectric element is located along an opposite radius of the flange at a distance away from the second inner surface that is substantially one half the opposite radius.

17. The ultrasonic transducer of claim 16, wherein each piezoelectric element is oriented to output a sonic beam at about a 45 degree angle to the axis of a pipe, where one beam goes clockwise and the other goes counterclockwise.

18. A flow meter comprising:
   an upstream flange; and
   a downstream flange,
   wherein each flange includes a transducer assembly that comprises:
      a piezoelectric element attached to a sonic lens;
      a support ring that holds the piezoelectric element; and
      a spoke, wherein one end of the spoke is connected to the support ring and an opposing end of the spoke is connected to an inner surface of the flange.

19. The flow meter of claim 18, wherein the support ring is metal, and the support ring surrounds a clamp that surrounds the piezoelectric element, wherein a sonic impedance of the clamp is less than that of the support ring.

20. The flow meter of claim 19, wherein the clamp is plastic.

21. The flow meter of claim 18, wherein the upstream flange is configured to be mounted to an end of a pipe and the downstream flange is configured to be mounted to an opposing end of the pipe.

22. The flow meter of claim 18, further comprising a processor configured to receive an output of each piezoelectric element to generate a flow rate.

23. The flow meter of claim 22, wherein the processor is further configured to provide an output to each piezoelectric element to cause each to vibrate.

24. The flow meter of claim 18, wherein the sonic lens is a plastic film having a ⅞ wavelength thickness that coats the piezoelectric element.

25. The flow meter of claim 18, wherein one of the piezoelectric elements is arranged to transmit a sonic beam along a selected one of an axial path, a diametric path, and a chordal path within the flange, and the other is arranged to receive the sonic beam along the selected path.

26. The flow meter of claim 18, wherein each flange includes a second one of the transducer assemblies, wherein a length of each spoke of each transducer assembly is set so that each piezoelectric element is at a distance of one half radius of the corresponding flange of a spool section of a pipe attached to the flange.

27. The flow meter of claim 26, wherein in each flange, each of the two piezoelectric elements is oriented to output a sonic beam at substantially a 30 degree circumferential angle below a horizontal centerline of a pipe attached to the flange.

28. A flange for a pipe comprising:
  a first ring supporting a first piezoelectric element that is attached to a first sonic lens, wherein the first ring is connected to an inner surface of the flange via a first spoke; and
  a second ring supporting a second piezoelectric element that is attached to a second sonic lens, wherein the second ring is connected to an opposing inner surface of the flange via a second spoke.

29. The flange of claim 28, further comprising a conductive wire that is connected to a conductive tab connected to the first piezoelectric element, wherein the wire passes entirely through the spoke.

30. The flange of claim 28, wherein each piezoelectric element is arranged at a distance of about one half the inside radius of the flange.

31. The flange of claim 30, wherein each piezoelectric element is arranged to transmit a sonic beam at an angle of about 45 degrees in rotational directions that oppose one another.

32. The flange of claim 28, wherein each sonic lens is a plastic film having a ¼ wavelength thickness that coats the respective piezoelectric element.

* * * * *